United States Patent [19]

Sakakibara

[11] Patent Number: 4,952,082
[45] Date of Patent: Aug. 28, 1990

[54] TEXT PROCESSING SYSTEM FOR CYCLICALLY SHIFTING FORMAT MEMORY

[75] Inventor: Hisao Sakakibara, Chita, Japan

[73] Assignee: Brother Kogyo Kabushiki Kaisha, Aichi, Japan

[21] Appl. No.: 463,789

[22] Filed: Jan. 8, 1990

Related U.S. Application Data

[63] Continuation of Ser. No. 198,777, May 25, 1988, abandoned.

[30] Foreign Application Priority Data

May 24, 1987 [JP] Japan ................................ 62-130886

[51] Int. Cl.⁵ .............................................. B41J 11/44
[52] U.S. Cl. ...................................... 400/76; 364/518; 400/279
[58] Field of Search ................... 400/61, 76, 62–63, 400/67, 68, 279; 564/225.6, 226.1, 244.4, 943.43, 964, 964.1, 964.7, 510–519, 521

[56] References Cited

U.S. PATENT DOCUMENTS

| | | | |
|---|---|---|---|
| 4,686,649 | 8/1987 | Rush et al. | 400/76 |
| 4,687,353 | 8/1987 | DeGeorge et al. | 400/76 |
| 4,712,929 | 12/1987 | Kitaoka | 400/76 |
| 4,725,158 | 2/1988 | Ueda et al. | 400/63 |
| 4,728,964 | 3/1988 | Sasaki | 400/61 X |
| 4,820,063 | 4/1989 | Mori | 400/76 |
| 4,826,333 | 5/1989 | Tanara | 400/76 |
| 4,831,583 | 5/1989 | Pascoe | 400/76 X |
| 4,832,513 | 5/1989 | Ikekita | 400/61 |
| 4,848,140 | 1/1989 | Mori | 400/76 |
| 4,861,175 | 8/1989 | Hori et al. | 400/76 |

FOREIGN PATENT DOCUMENTS

53-29500  8/1978  Japan .

*Primary Examiner*—Eugene H. Eickholt
*Attorney, Agent, or Firm*—Kane, Dalsimer, Sullivan, Kurucz, Levy, Eisele and Richard

[57] ABSTRACT

A text processing system such as an electronic typewriter and a word processor which comprises format information memory having storage areas for storing different sets of format information. A selected set of the format information is cyclically shifted to a particular storage area of the format information memory and can be directly read out. The inputted text data is printed in accordance with the selected set of the format information stored in the particular storage area.

7 Claims, 5 Drawing Sheets

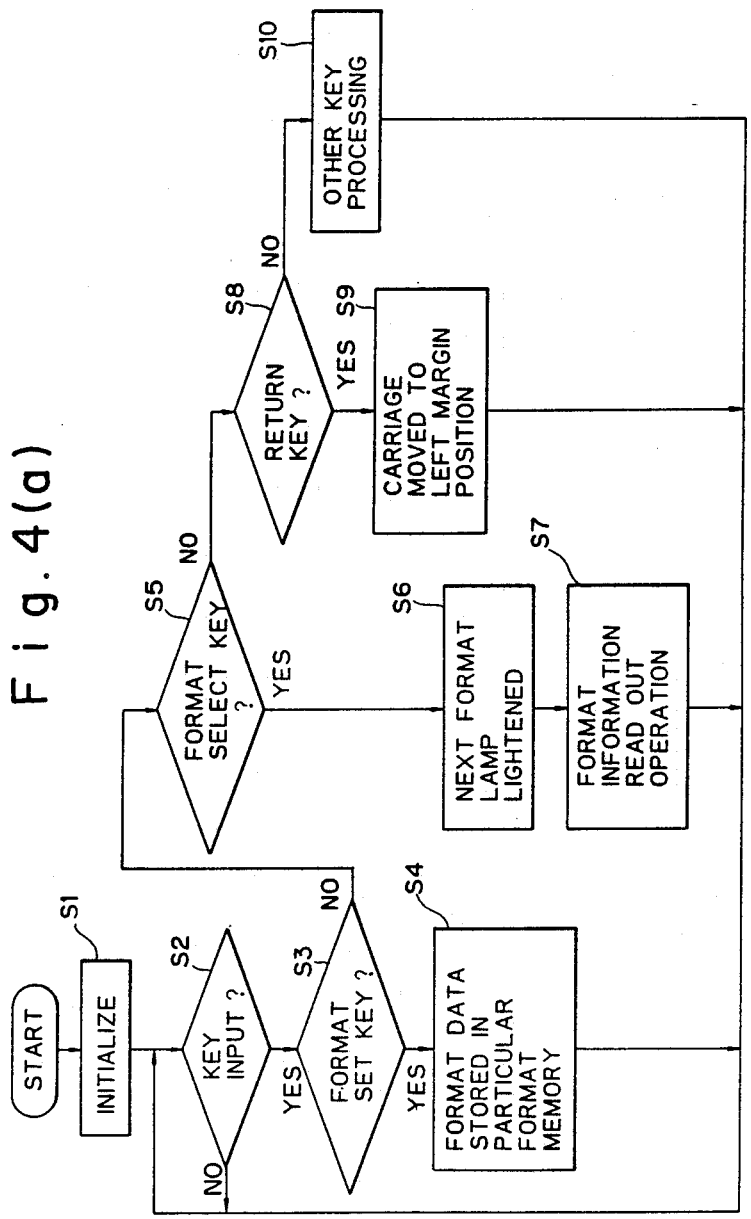

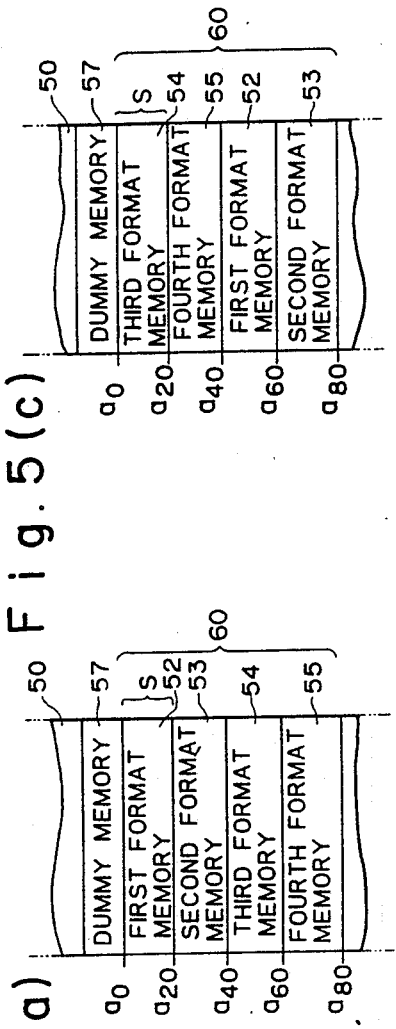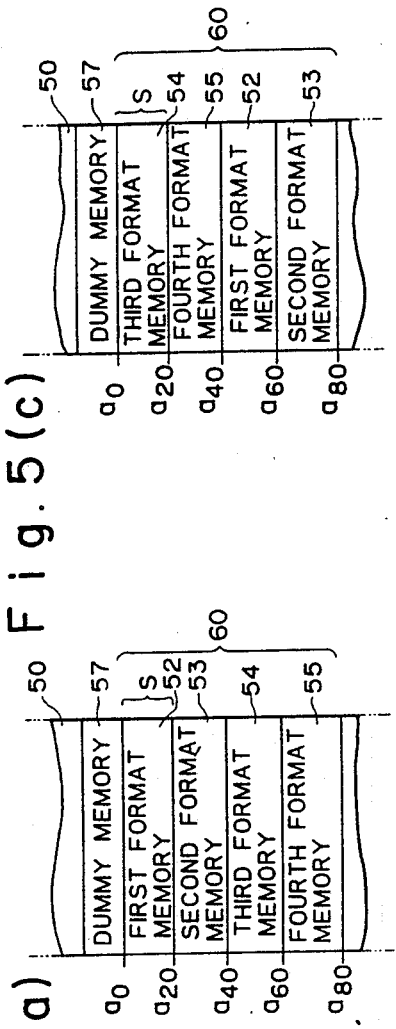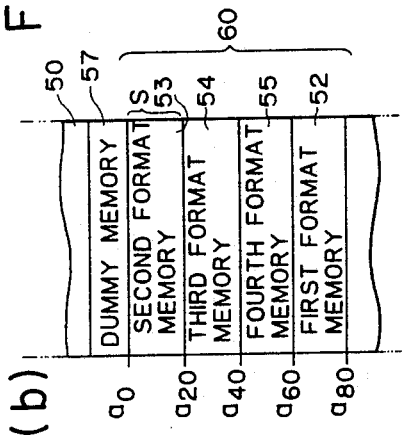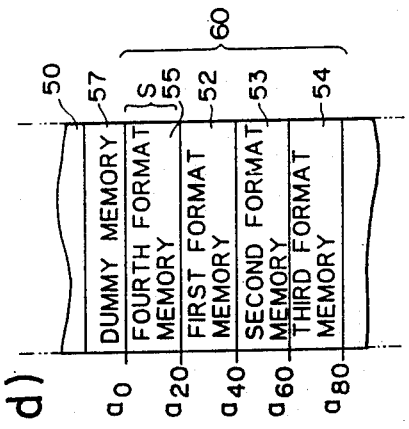

TEXT PROCESSING SYSTEM FOR CYCLICALLY SHIFTING FORMAT MEMORY

This is a continuation of co-pending application Ser. No. 198,777 filed on May 25, 1988 now abandoned.

BACKGROUND OF THE INVENTION

This invention relates to a text processing system such as electronic typewriter and word processor provided with a format information memory for storing plural sets of format information.

When printing a text with the electronic typewriter, it is generally required to specify print condition or format such as left and right margin positions, a line feed amount and a print pitch. Since it is bothersome to set up such format upon each printing, several different sets of format information are stored in memory in advance and a desired one is selected upon necessity so that a text is printed in accordance with the selected format information.

In an electronic control system disclosed in Japanese Patent Publication Sho No. 53-29500, there are stored in memory several different control programs such as whether the decimal point is to be printed, whether a number is to be punctuated with a comma at every third digit and whether the minus symbol is to be placed before or after the printed data. By combining these control programs as desired, plural sets of print format information may be set up and changed. In accordance with this prior art solution, however, it is very difficult and troublesome to develop an additional print condition other than those stored in the memory as control programs. A greater storage capacity is needed for one print format.

There has been provided an electronic typewriter incorporating a microcomputer, which includes RAM (random access memory) having a plurality of format information memories for storing different sets of format information and a work memory for reading out and changing the format information. In response to key operation, a specific format information can be read out from its format information memory and transferred to a work memory. The input data is printed in accordance with the format information stored in the work memory. This prior art electronic typewriter is, however, associated with a problem that it also requires the work memory to read out and change the format information stored in the format information memories, resulting in a greater storage capacity of RAM. Moreover, different keys have to be operated to read out a specific set of format information and also to store the changed format information.

SUMMARY OF THE INVENTION

It is therefore an object of the invention to provide a text processing system capable of directly and promptly reading out the selected format information, requiring relatively a small storage capacity of RAM.

To achieve this object, according to the invention, there is provided a text processing system comprising inputting means for inputting text data; format information memory means having storage areas for storing different format information, the storage areas including a particular storage area from which the format information stored therein can be read out; format select means for selecting a desired one format information stored in the format information memory means; control means for cyclically shifting the selected format information to the particular storage area of the format information memory means; and outputting means for visually representing the inputted text data in accordance with the selected format information.

With the text processing system according to the invention, the format information memory is provided with a number of storage areas for storing different format information, from which a desired one of the format information may be selected by the format select means. The control means will shift the selected format information to the particular storage area of the format information memory. Direct access to the format information stored in the particular storage area can be made. Therefore, the outputting means prints the inputted test data in accordance with the selected format information which is now stored in the particular storage area.

BRIEF DESCRIPTION OF THE ACCOMPANYING DRAWINGS

Figure 4B:
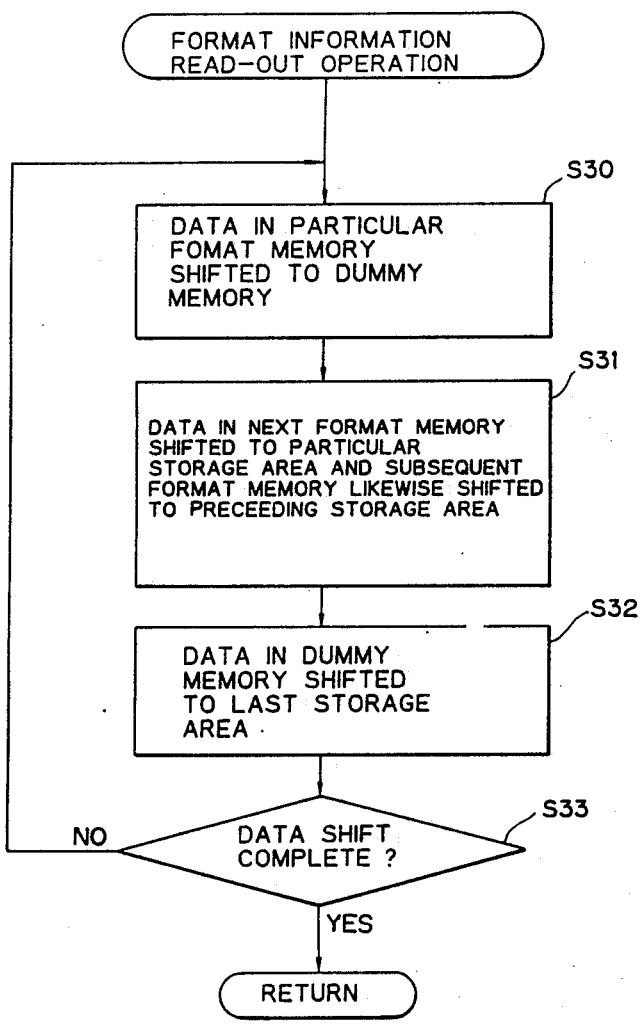

FIGS. 4(a) and 4(b) are flow charts of a format information read-out control routine executed by the control system; and FIGS. 5(a) to 5(d) are explanatory views illustrating allotments of storage areas of a format information memory to respective format memories.

DESCRIPTION OF THE EMBODIMENTS

Figure 1:
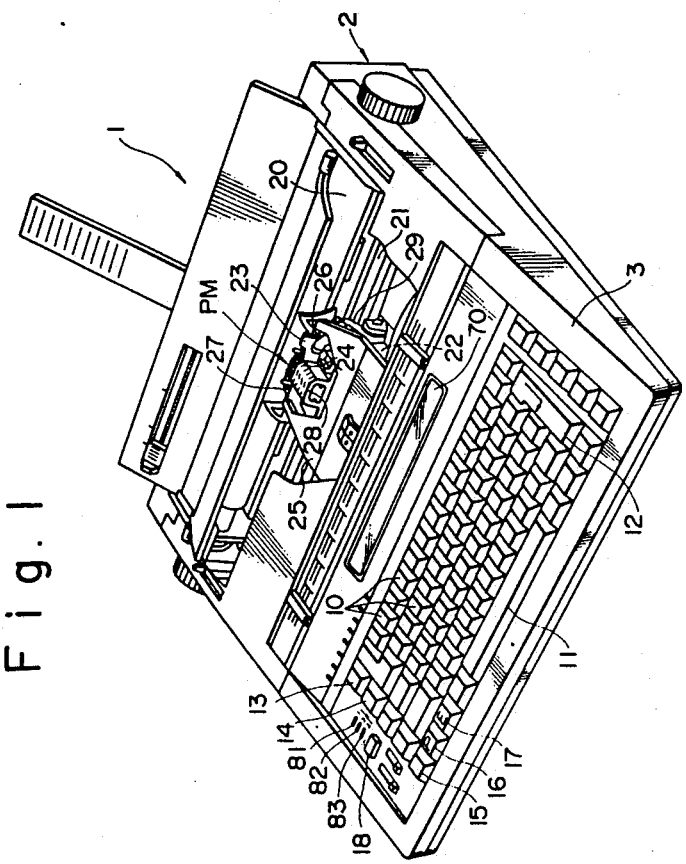
FIG. 1 is an oblique view of an electronic typewriter embodying the invention.

Referring specifically to FIG. 1, an electronic typewriter 1 embodying the invention has a frame 2, a keyboard 3 and a print mechanism unit PM. Behind the keyboard 3 is provided a display 70 capable of showing one line of characters and symbols inputted.

The keyboard 3 is, as in a prior art typewriter, furnished with a plurality of operating keys including character keys 10 for inputting alphabets, figures and symbols, a left margin set key 13 for setting a left margin position, a right margin set key 14 for setting a right margin position, a tab key 15 for tab setting a pica pitch key 16 for setting the print pitch to the pica pitch, an elite pitch key 17 for setting the print pitch to the elite pitch, a format select key 18 for alternatively selecting a desired one of format memories 52 to 55 to be described later. The margin set keys 13 and 14, tab key 15, and pitch set keys 16 and 17 will be hereinafter generally referred to as format set keys.

Figure 2:
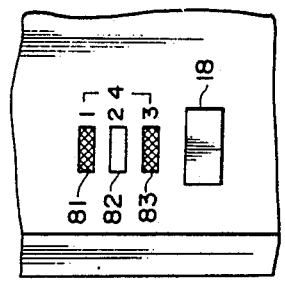
FIG. 2 is a plan view, on an enlarged scale, showing a part of a keyboard section of the typewriter including a lamp indicator.

The keyboard 3 is also provided with a first lamp 81, a second lamp 82 and third lamp 83 for indicating the reference number of the format memory now selected. More particularly, the first, second and third lamps 81, 82 and 83 are lightened when the first, second and third format memories 52, 53 and 54 are selected, respectively. When the fourth format memory 55 is selected, both the first and third lamps 81 and 83 will be lightened as shown in FIG. 2.

The print mechanism unit PM includes a platen 29 for feeding a print sheet (not shown), a carriage 22 reciprocally runnably supported by a guide 21 extending in parallel with the platen 29, a print wheel 24 having plural print elements and housed in a wheel cassette 23, a print ribbon 26 housed in a ribbon cassette 25, a print hammer driven by a solenoid 28 for striking a desired one of the print elements of the print wheel 24 via the print ribbon 26, and a ribbon switching mechanism for selectively placing the print ribbon 26 or a correction ribbon 29 in proper print position. Such arrangement of the print mechanism unit PM is substantially conventional and therefore no further description would be required.

Figure 3:
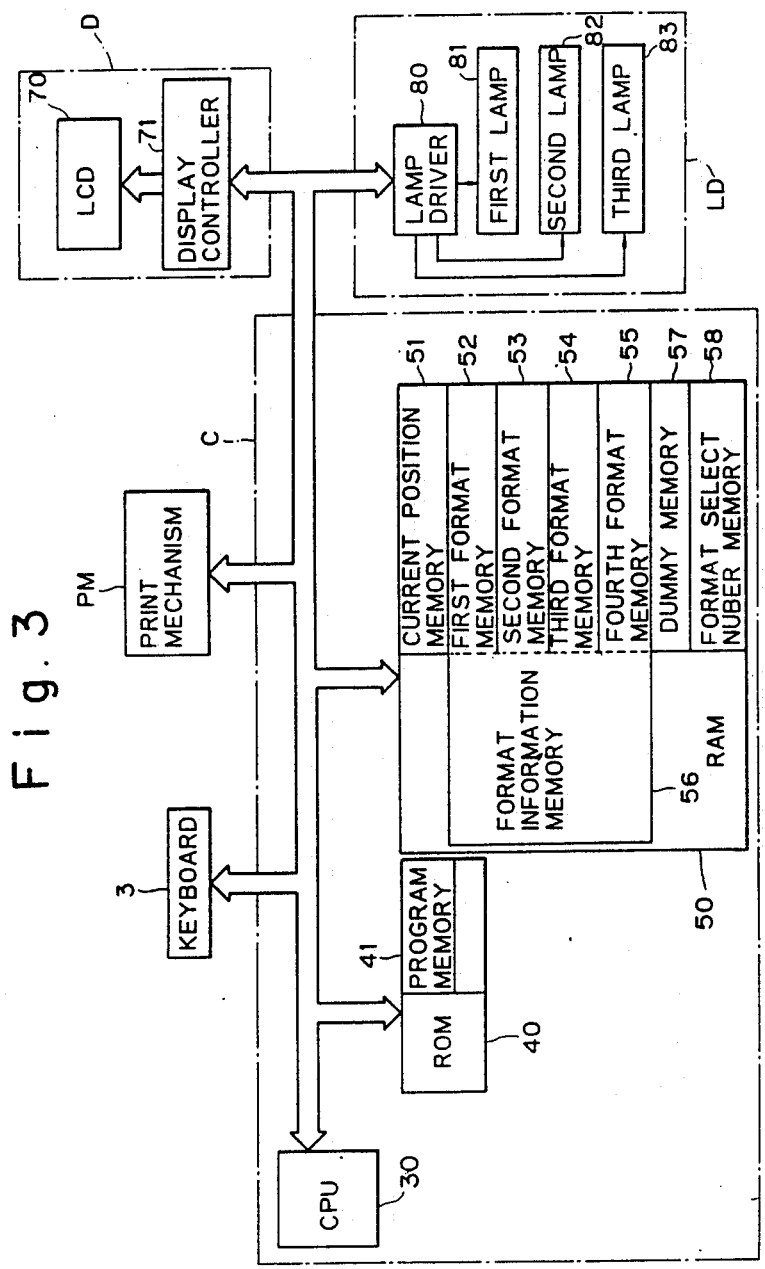
FIG. 3 is a block diagram of a control system of the typewriter.

Now a control system for the electronic typewriter will be described with reference to the block diagram of FIG. 3.

The electronic typewriter 1 comprises the keyboard 3, the print mechanism unit PM, a display unit D and a control unit C. The keyboard 3, the print mechanism unit PM and the display unit D are respectively connected to CPU (central processing unit) 30 of the control unit C via data bus.

The control unit C also includes ROM (read only memory) 40 and RAM (random access memory) 50, each connected to CPU 30 via data bus.

ROM 40 is provided with a program memory 41 for storing a format information read-out control program to be described later, as well as a control program for controlling operation of the print mechanism unit PM and the display unit D in response to code data inputted by character keys 10 and various function keys arranged on the keyboard 3.

RAM 50 includes a current position memory 61 for storing the current position of a print head or carriage 22 each time the carriage 22 is moved along the print line, a key buffer for temporarily storing data inputted by the keyboard operation. A line buffer for storing at least on print line of data transferred from the key buffer at an address corresponding to each print position along the print line, a print buffer operated in response to data transferred from the line buffer to actuate the print mechanism unit PM, a text memory for storing the inputted data as text data, and various memories for temporarily storing the results of operation of CPU 30.

RAM 50 further includes a format information memory 56 having a first format memory 52, a second format memory 53, a third format memory 54 and a fourth format memory 55 for storing therein line format information required to print a text on the print paper including right and left margin position data, a dummy memory 57 consisting of several bytes for shifting the format data stored in the particular format memory, and a format select number memory 58 for storing the number of the selected one of the format memories 52 to 55. Upon one depression of the format select key 18, the first lamp 81, the second lamp 82, the third lamp 83, the first and third lamps 81 and 83, the first lamp 81 are sequentially lightened to respectively indicate that the first format memory 52, the second format memory 53, the third format memory 54, the fourth format memory 55, the first format memory 52 are now selected. The format select number memory 58 will store the number of the last selected format memory. A back-up battery is provided for retaining data stored in the first to fourth format memories 52 to 55 and the format select number memory 58 even if a power switch of the electronic typewriter is turned off.

The format information memory 56 has four storage areas for respectively storing the first to fourth format memories 52 to 55, including one particular storage area S from which the format data can be directly accessed to be changed or read out. Each storage area in the format information memory 6 has the same storage capacity as that of one format memory.

In response to data inputted through key operation, CPU 30 controls the print mechanism unit PM to print corresponding characters and symbols on the print sheet. The inputted data are sequentially stored in the line buffer at their specific addresses corresponding to the respective print position along the print line. Thus, the line buffer may store the inputted data in one line, which will in turn be represented in the liquid crystal display 70. The said inputted data in one print line will he stored in the text memory upon operation of the return key 12.

The lamp indicator LD consists of the first to third lamps 81, 82 and 83, and a lamp driver 80 connected to CPU via data bus for outputting drive signals to the lamps.

The display unit D is of a conventional type and comprises the liquid crystal display 70 and a display controller 71 operated in response to the inputted data to output a drive signal to the display 70. The display 70 represents one print line of the inputted data which is transferred from CPU 30 via data bus.

Reference should now be made to the flow chart shown in FIGS. 4(a) and 4(b) to describe the format information read-out control operation with the control unit C of the electronic typewriter.

When the typewriter is powered the control routine starts with step S1 (hereinlater referred to simply as S1, as for other steps) for initialization. At this time, one of the format memories 52 to 55 is stored in the particular storage area S and the said one format memory is indicated by designating the corresponding format number which is shown at the lamp indicator LD. For example, the first lamp 81 is lightened when the first format memory 52 is stored in the particular storage area S provided at a top of the format information memory 56 as shown in FIG. 5(a).

Next in S2 key input is waiting. When there is any key input, whether the key thus operated is the format set key consisting of the function keys 13 to 17 is discriminated at S3. If so, the procedure goes to S4 where the format data inputted by operation of the format key is directly stored in a certain address of the format memory located in the particular storage area S of the format information memory 56, then returning to S2.

For example, with the first format memory 52 located in the particular storage area S of the format information memory 56 as shown in FIG. 5(a), the left margin set key 13 is operated to input a fresh left margin data which will directly enter a certain address of the first format memory 52 adapted to store the left margin position.

When the key inputted is the format number select key 18, the process goes through S3 and S5 to S6 for controlling such that one format lamp designating the next format number is lightened in response to data stored in the format select number memory 58. Provided such format number select key 18 is operated where the first format memory 52 is stored in the particular storage area S as shown in FIG. 5(a), the next, second lamp 82 is turned on.

Next in S7, the format information read-out operation is performed as in the manner particularly shown in the flow chart of FIG. 4(b). More particularly, in S30 data of several bytes stored in the first several addresses in the format memory located in the particular storage area S (hereinlater referred to as particular format memory M) is transferred to the dummy memory 57 and stored temporarily therein. The remaining data in the particular format memory M is shifted to the first several addresses to fill the vacancy. To remaining several addresses in the particular format memory is then shifted data of several bytes stored in the first several addresses in the next format memory succeeding to the particular format memory M. Such data transfer is performed in S31. For example, when the first format memory is the particular format memory M as shown in FIG. 5(a), data of first several bytes in the first format memory 52 are shifted and stored in the dummy buffer 57 in S30. Then, the remaining data of the first format memory 52 are shifted to the vacant, first several addresses, and the first several bytes of the second format memory 53 are shifted to the last several addresses of the first format memory 52. Data in the third and fourth format memories 54 and 55 will be likewise shifted in sequence, in S31. Thus, when such data shift operation is completed, there will remain several blank addresses at the end of the fourth format memory 55.

In the next S32, data stored in the dummy memory 57 is shifted to the last several blank addresses in the fourth format memory 55. S33 discriminates whether the entire data stored in the particular format memory M has been shifted to the last storage area in the format information memory 56. If not, the procedures S30 to S33 are repeated, while if the discrimination result is YES the procedure returns to S2. In other words, with the case of FIG. 5(a), the procedures S30 to S33 are repeated until the entire data stored in the first format memory 52 or the particular format memory M has been shifted to the last storage area, next to the fourth format memory 55, and the second format memory 53 is now located in the particular storage area S, as shown in FIG. 5(b).

Procedures of S5 to S7 are repeated each time the format select key 18 is operated. When, for instance, the format select key 18 is operated with the second format memory 53 located in the particular storage area S as shown in FIG. 5(b), allotment of the format information memory 56 will be changed to be as shown in FIG. 5(c) where the third format memory 54 is now located in the particular storage area S, and the third lamp 83 is lightened to indicate that data in the third format memory 54 can now be read out. In summary, the format memories 52 to 55 are cyclically shifted to the particular storage area S one by one upon depression of the format select key 18 and the particular format memory M is allowed to be accessed for change and read-out of format data.

When the return key 12 is then operated, the procedure goes through S2, S3, S5 and S8 to S9. In S9, the carriage 22 is moved back to the left margin position in response to the left margin position data stored in the particular format memory M, then returning to S2.

When character keys 10 are now operated, the procedure goes through S2, S3, S5, S8 to S10 so that corresponding characters are printed on the print sheet by means of the print mechanism unit PM in accordance with the format data stored in the particular format memory M, starting from the predetermined left margin position along the print line, then returning to S2. When keys other than format set keys 13 to 17, format select key 18, return key 12 and character keys 10 are operated, certain processing is executed also in S10.

With the typewriter in a memory mode, likewise, text data stored in the text memory are read out to print a corresponding text in accordance with the format data of the particular format memory M.

As described above, a desired one of the format memories 52 to 55 can be shifted to the particular storage area S of the format information memory 56 by merely operating the format select key 18. The particular format memory M can be directly and quickly read out.

While the invention has been described in conjunction with a specific embodiment thereof, it is to be understood that many variations and modifications may be made without departing the spirits and scope of the invention as defined in the appended claims. For instance, the format information memory 56 may include five or more format memories. The dummy memory 57 may have the storage capacity corresponding to that of one format memory for sooner data shifting operation. The invention can also be applied to typewriters having printers of other types, including thermal printers, shuttle printers and wire-dot impact printers.

What is claimed is:

1. A text processing system which comprises:
   inputting means for inputting text data;
   format information memory means having a plurality of storage areas, each of said storage area respectively storing a set of format information, said format information memory means including a particular storage area from which the format information can be read out;
   control means for controlling said each of set of format information so as to be cyclically located at said particular storage area; and
   outputting means for visually representing the inputted text data in accordance with the format information located at said particular storage area.

2. The text processing system according to claim 1 wherein said control means cyclically shifts the format information in such manner that at least a part of data stored in said particular storage area is shifted to said temporary memory means, data stored in subsequent storage areas are successively shifted to the respective prior storage areas to fill vacancy created by the data shifting, and said data temporarily stored in said temporary memory means is shifted to a vacancy created in the last storage area of said format information memory means, said data shifting being repeatedly performed until said particular storage area is occupied with the desired set of the format information.

3. The text processing system according to claim 1 which further comprises display means for indicating the set of the format information to be located at said particular storage area.

4. The test processing system according to claim 1 which further comprises format set means for inputting format data to the format information located in said particular storage area of said format information memory means.

5. The text processing system according to claim 1 wherein said control means includes temporary memory means for temporarily storing at least a part of the set of format information having been located at said particular storage area.

6. A text processing system according to claim 5 wherein a capacity of said temporary memory means is similar to a size of said each of set of format information.

7. A text processing system which comprises:
   inputting means for inputting text data;

format information memory means having a plurality of storage areas for respectively storing a set of format information;

format input means for inputting format information data into said format information memory means;

control means for controlling said each of set of format information so as to be cyclically located at a particular storage area included in said format information memory means; and outputting means for visually representing the inputted text data in accordance with the format information located at said particular storage area.

* * * * *